United States Patent [19]

Jordan, Jr.

[11] Patent Number: 5,063,501

[45] Date of Patent: Nov. 5, 1991

[54] INFORMATION CONTROL SYSTEM FOR SELECTIVELY TRANSFERRING A TREE LOCK FROM A PARENT NODE TO A CHILD NODE THEREBY FREEING OTHER NODES FOR CONCURRENT ACCESS

[75] Inventor: John D. Jordan, Jr., Worthington, Ohio

[73] Assignee: AT&T Bell Laboratories, Murray Hill, N.J.

[21] Appl. No.: 452,096

[22] Filed: Dec. 18, 1989

[51] Int. Cl.$^5$ .............................................. G06F 15/40
[52] U.S. Cl. ................... 395/725; 364/246.6; 364/246.8; 364/282.1; 364/282.2; 364/DIG. 1
[58] Field of Search ................................. 364/200, 900

[56] References Cited

U.S. PATENT DOCUMENTS

| | | | |
|---|---|---|---|
| 4,604,694 | 8/1986 | Hough | 364/200 |
| 4,627,019 | 12/1986 | Ng | 364/900 |
| 4,677,550 | 6/1987 | Ferguson | 364/200 |
| 4,698,752 | 10/1987 | Goldstein et al. | 364/200 |
| 4,716,528 | 12/1987 | Crus et al. | 364/300 |
| 4,823,310 | 4/1989 | Grand | 364/900 |
| 4,827,411 | 5/1989 | Arrowood et al. | 364/300 |
| 4,827,508 | 5/1989 | Shear | 380/4 |
| 4,914,569 | 4/1990 | Levine et al. | 364/200 |
| 4,937,736 | 6/1990 | Chang et al. | 364/200 |
| 4,965,719 | 10/1990 | Shoens et al. | 364/200 |

OTHER PUBLICATIONS

"Concurrent Operation on B-Tree With Overtaking", by Sagiv, ACM Sigart-Sigmond Symposium on Principle of Database System, Mar. 1985, pp. 28-37.
"Locking Protocol for Concurrent Operations on B--Trees", IBM Technical Disclosure Bulletin, vol. 19, No. 10, Mar., 1977, pp. 3887-3889.
"Multi-Access Data Sharing Facility Utilizing Magnetic Bubble Storage", IBM Technical Disclosure Bulletin, vol. 23, No. 8, Jan. 1981, pp. 2882-3885.
"Ubiquitous B-Tree", Computer Surveys, vol. 11, no. 2, Jun. 1979, pp. 121-137.
"Multilevel Locking with Deadlock Avoidance", IBM Technical Disclosure Bulletin, vol. 21, No. 4, Sep., 1978, pp. 1723-1728.
"Efficient Locking for Concurrent Operation on B--Trees", ACM Transaction on Database System, vol. 6, No. 4, Dec. 1981, pp. 650-670.
"Transaction Monitoring in Encompass (TM); Reliable Distributed Transation Processing", by Borr, Procedure International Conference on Very Large Data Bases, Sep. 1981, pp. 244-254.
"Index Locking and Splitting", IBM Technical Disclosure Bulletin, vol. 25, No. 78, Dec., 1985, pp. 3725-3927.
"Locking Architecture in a Multiple Virtual Memory Multi-Processing System", IBM Technical Disclosure Bulletin, vol. 16, No. 7, Dec. 1973.
"Sharing of Disk Files Without Locking", IBM Technical Disclosures Bulletin, vol. 22, No. 7, Dec., 1979, pp. 2887-2889.
"Integrated Concurrency and Shared Buffer Coherency Control for Multi-System", IBM Technical Disclosure Bulletin, vol. 28, No. 10, Mar., 1986, pp. 4642-4650.
"Index Mini-Pages", IBM Technical Disclosure Bulletin, vol. 25, No. 11A, Apr. 1983, 5460-5463.
"Operating Systems-An Advanced Course," Messrs. M. J. Flynn, J. N. Gray, A. K. Jones, K. Lagally, H. Opderbeck, G. J. Popek, B. Randel, J. H. Saltzer and H. R. Wiehle, *Springer-Verlag, New York-Berlin-Heidelberg-Tokyo, Third printing, 1984, pp. 430 through 450.*
"Object-Oriented Concepts and Data Bases and Applications," Messrs. Won Kim and F. H. Lochovsky, *Addison-Wesley*, 1989, pp. 270 through 273.

Primary Examiner—Allen R. MacDonald
Assistant Examiner—Ayaz R. Sheikh
Attorney, Agent, or Firm—Dwight A. Marshall

[57] ABSTRACT

Apparatus and method for controlling concurrent process access of infrastructures comprising tree structures of complex object nodes of information. The apparatus and method respond to a request of a computer process by selectively applying a tree lock to a node to lock the node and child nodes located in a tree structure of the tree locked node. Subsequently, the process transports the applied tree lock from the node to selected child nodes located in the tree structure of the node thereby freeing the unlocked node and child nodes thereof for subsequent access by concurrently running ones of the processes.

14 Claims, 5 Drawing Sheets

TABLE 1

| TYPE LOCK | ANCESTOR LOCK |
|---|---|
| TREE EXCLUSIVE (TE) | INTERMEDIATE EXCLUSIVE (IE) |
| NODE EXCLUSIVE (NE) | INTERMEDIATE EXCLUSIVE (IE) |
| TREE RESERVE (TR) | INTERMEDIATE RESERVE (IR) |
| NODE RESERVE (NR) | INTERMEDIATE RESERVE (IR) |
| INTERMEDIATE RESERVE (IR) | INTERMEDIATE RESERVE (IR) |
| INTERMEDIATE EXCLUSIVE (IE) | INTERMEDIATE EXCLUSIVE (IE) |
| TREE SHARE (TS) | INTERMEDIATE SHARE (IS) |
| NODE SHARE (NS) | INTERMEDIATE SHARE (IS) |
| INTERMEDIATE SHARE (IS) | INTERMEDIATE SHARE (IS) |

TABLE 2

|    | TE | NE | TR | NR | IR | IE | TS | NS | IS |
|----|----|----|----|----|----|----|----|----|----|
| TE | ✓  | ✓  | ✓  | ✓  | ✓  | ✓  | ✓  | ✓  | ✓  |
| NE | ✓  | ✓  | ✓  | ✓  |    |    | ✓  | ✓  |    |
| TR | ✓  | ✓  | ✓  | ✓  | ✓  | ✓  |    |    |    |
| NR | ✓  | ✓  | ✓  | ✓  |    |    |    |    |    |
| IR | ✓  |    |    | ✓  |    |    |    |    |    |
| IE | ✓  |    |    | ✓  |    |    | ✓  |    |    |
| TS | ✓  | ✓  |    |    |    | ✓  |    |    |    |
| NS | ✓  | ✓  |    |    |    |    |    |    |    |
| IS | ✓  |    |    |    |    |    |    |    |    |

INFORMATION CONTROL SYSTEM FOR SELECTIVELY TRANSFERRING A TREE LOCK FROM A PARENT NODE TO A CHILD NODE THEREBY FREEING OTHER NODES FOR CONCURRENT ACCESS

CROSS-REFERENCE TO RELATED APPLICATIONS

This application is related to the following applications, which are assigned to the same assignee and concurrently filed herewith:
J. D. Jordan, Jr., Case 1, "Information Control System";
J. D. Jordan, Jr., Case 2, "Information Control System";
J. D. Jordan, Jr., Case 3, "Information Control System"; and
J. D. Jordan, Jr., Case 4, "Information Control System."

TECHNICAL FIELD

The invention relates to apparatus and method for controlling concurrent process operations against composite information infrastructures.

BACKGROUND AND PROBLEM

Composite infrastructures, such as data base systems used with computer systems, oftentimes have an information architecture environment which may have a number of interconnected complex object nodes. Each object node may have independent tree-like structures comprising hierarchies of interconnected complex subordinate object nodes of information wherein each subordinate object node may further comprise independent sub-tree structures of interconnected sub-nodes of information.

Computer systems using data base infrastructures may run processes wherein the processes concurrently access the infrastructures. In particular, a computer system may run a number of processes each of which requires access to complex infrastructures comprising data base architectures. A process may require access to one, several or all of the infrastructure nodes many times during the running of the process. In order to insure continuity of operation, a process may apply locks against a node that will operate against the node and impliedly against all the lower hierarchical subordinate and sub-nodes in the tree structure of the node to allow only the process holding the lock to write into and read information from the node. In addition, each ancestor node of the locked node is assigned an intermediate type of lock to ensure a consistency of data. During the time that a process holds the lock, other processes concurrently running on computers served by the complex infrastructures may be prevented from writing into and reading information from the locked node and sub-nodes located in the tree structure of the locked node.

A problem arises during the concurrent operation of multiple processes in that when one process locks a node other processes that require access to the locked node or children nodes located in tree structures of the locked node may be delayed in obtaining access to the data base infrastructure until the node lock is removed. Another problem arises in that concurrently running processes may be required to selectively apply locks or intermediate type of locks to child nodes located in different tree structures containing the previously locked node and are required to wait until the lock can be removed from the node. Yet another problem may arise in that one process requiring that a node be locked during the running of the process may have to wait during running of the process until a previously applied lock be removed from the node.

SOLUTION

The foregoing problems are solved by apparatus and method arranged to control concurrent process operations against a complex infrastructure comprising tree structures of complex object nodes of information. The apparatus responds to a process request for a lock by selectively applying tree locks to a node to lock the node and ones of child nodes located in a tree structure of the locked node for future process access. The process may subsequently apply the tree lock to child nodes located in the tree structure of the previously tree locked node and remove the tree lock from the previously locked node thereby freeing the locked node and ancestor nodes located in the tree structure of the previously locked node for access by concurrently running ones of other processes.

The apparatus and method responds to a process requesting a tree lock for a node by selecting the node and generating a list of ancestral nodes located in a tree structure of the selected node. A compatibility of an intermediate type lock corresponding with the requested tree lock is determined with a current lock status of each listed ancestral node. After determination of the compatibility of the intermediate type lock with the current lock status of each listed ancestral node, the apparatus applies an intermediate type lock to each listed ancestral node. Upon applying the intermediate type lock to all listed ancestral nodes, the compatibility of the requested tree lock is determined with respect to a current lock status of the selected node and after determining that the requested tree lock is compatible, the apparatus applies the requested tree lock to the selected node. The process may subsequently apply tree locks to other child nodes located in the tree structure of the tree locked node and then remove the tree lock from the node thereby freeing the node for access by concurrently running ones of the processes.

DETAILED DESCRIPTION

Figure 1:
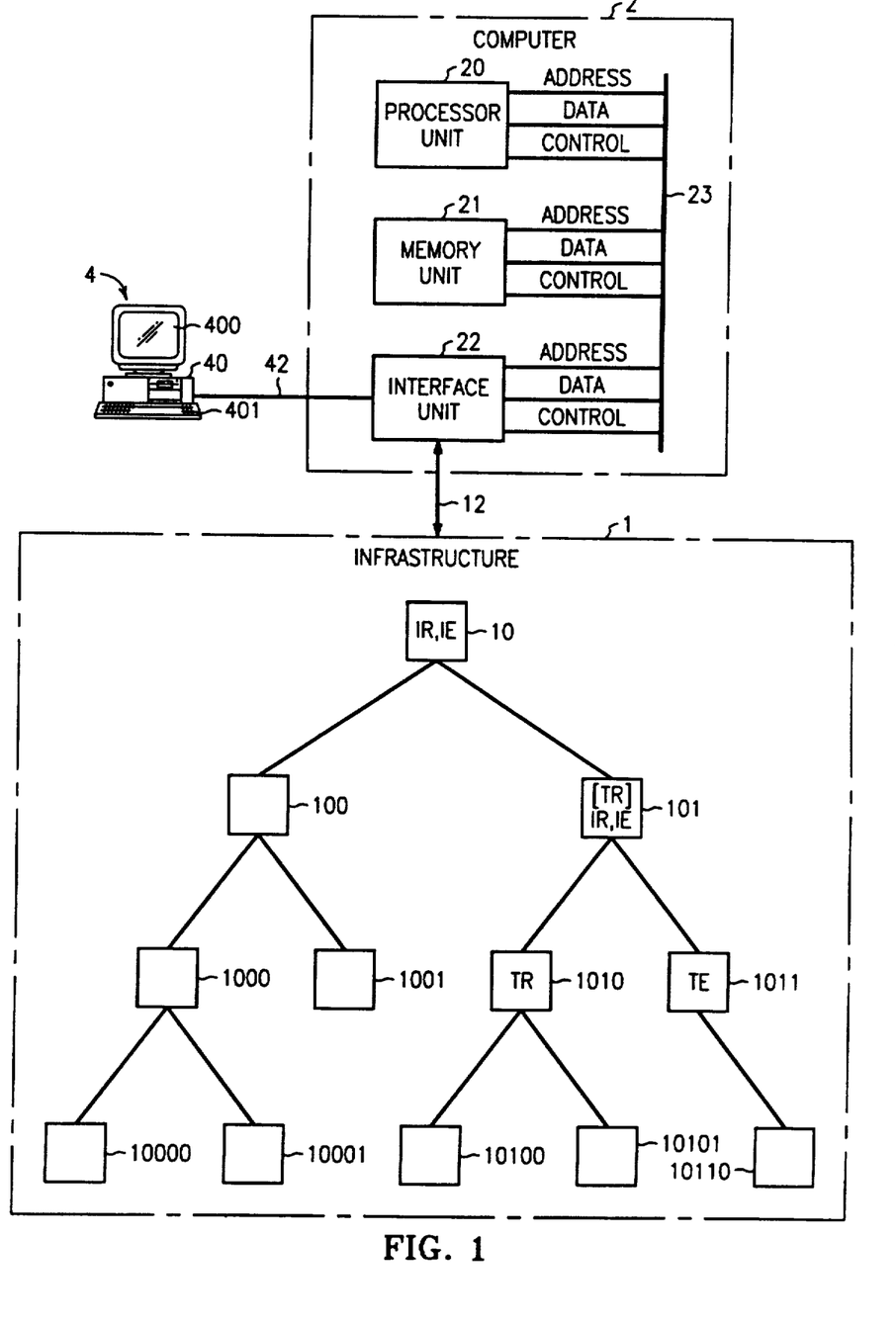
FIG. 1 illustrates an information control system embodying the principles of the invention.

In an exemplary embodiment of the invention, FIG. 1, a control information system has a storage system, such as a data base system, that may be located in storage apparatus intended for use with a single or a number of computer systems such as computer 2. A data base system, hereinafter referred to as infrastructure 1, may have a single or number of infrastructures 1 stored therein that may be used by processes running within computer 2. Each infrastructure 1 may comprise information required for the operation of the processes or may be software programs and macros that may be accessed at various times during the operation of a process and used by the process in the execution of various process features.

A typical information infrastructure, such as infrastructure 1, may have a root node 10 and a number of interconnected nodes 100, 101 each of which may, in an embodiment of the invention, be a file of information. Each node 100, 101, hereinafter referred to as a file node 100, 101, may have independent tree-like structures comprising hierarchies of interconnected complex subordinate nodes 1000, 1001, 1010, 1011 which may be blocks of information and which are hereinafter referred to block nodes 1000, 1001, 1010, 1011. A complex subordinate node or block node 1000, 1001, 1010, 1011 may further have independent sub-tree structures of interconnected sub-nodes 10000, 10001, 10100, 10101, 10110 of information and which are hereinafter referred to as information nodes. In the embodiment of the invention, infrastructure 1 has two file nodes 100, 101 interconnected with root node 10. File node 100, for example, may have two independent tree structures, one tree structure which includes block node 1001 and the other tree structure a two level hierarchy tree structure comprising block node 1000. Block node 1000 has two independent sub-tree structures, one of which includes information node 10000, and the other sub-tree structure which includes information node 10001. File node 101 is also assumed to have two independent tree structures, one tree structure which comprises a two level hierarchy of block node 1011 and information node 10110 and the other tree structure which comprises a two level hierarchy of block node 1010 which in turn has a sub-tree structure comprising information nodes 10100, 10101. It is to be understood that other configurations of infrastructure 1 are within the teaching of the invention and the invention is not limited by the specific structure of infrastructure 1.

Infrastructure 1 may be accessed by one or a number of computers such as computer 2. Computer 2 may be any of a number of different types of computers such as an AT&T 3B2-400 and 3B2-310 simplex or duplex computer. Such computers need not be described in detail for an understanding of the invention and in general have a processor unit 20, memory unit 21 and an interface unit 22 each connected by address, data and control leads to a bus 23. Interface unit 22 couples data links 12 and 42 extending, respectively, to data storage devices, such as infrastructure 1 and computer terminal 4, with bus 23 so that data may be exchanged with processor unit 20 by computer terminal 4 and infrastructure 1. Computer terminal 4, which may be any of a number of well-known computer terminals or personal computers, is coupled to interface unit 22 so that data may be entered into and read from processor unit 20 and memory unit 21. Computer terminal 4 may also have, but not necessarily limited thereto, a processor unit 40, an input device, such as keyboard 401, and a display device similar to CRT terminal 400.

It is to be understood that infrastructure 1 may be located remote from computer 2 and coupled therewith by data links 12. In addition, infrastructure 1, within an embodiment of the invention, may be coupled to a large number of computers 2 either by data links, such as data link 12, or by a communication network sometimes referred to as a ring or star type of network. Although FIG. 1 of the drawing shows infrastructure 1 coupled by data link 12 with interface unit 22, it is to be understood that infrastructure 1 could be resident as a data base in a memory storage device that could be a part of a mainframe computer, such as computer 2, and coupled with data bus 23 such that processes controlling the operation of computer 2 could access infrastructure 1.

Figure 2:
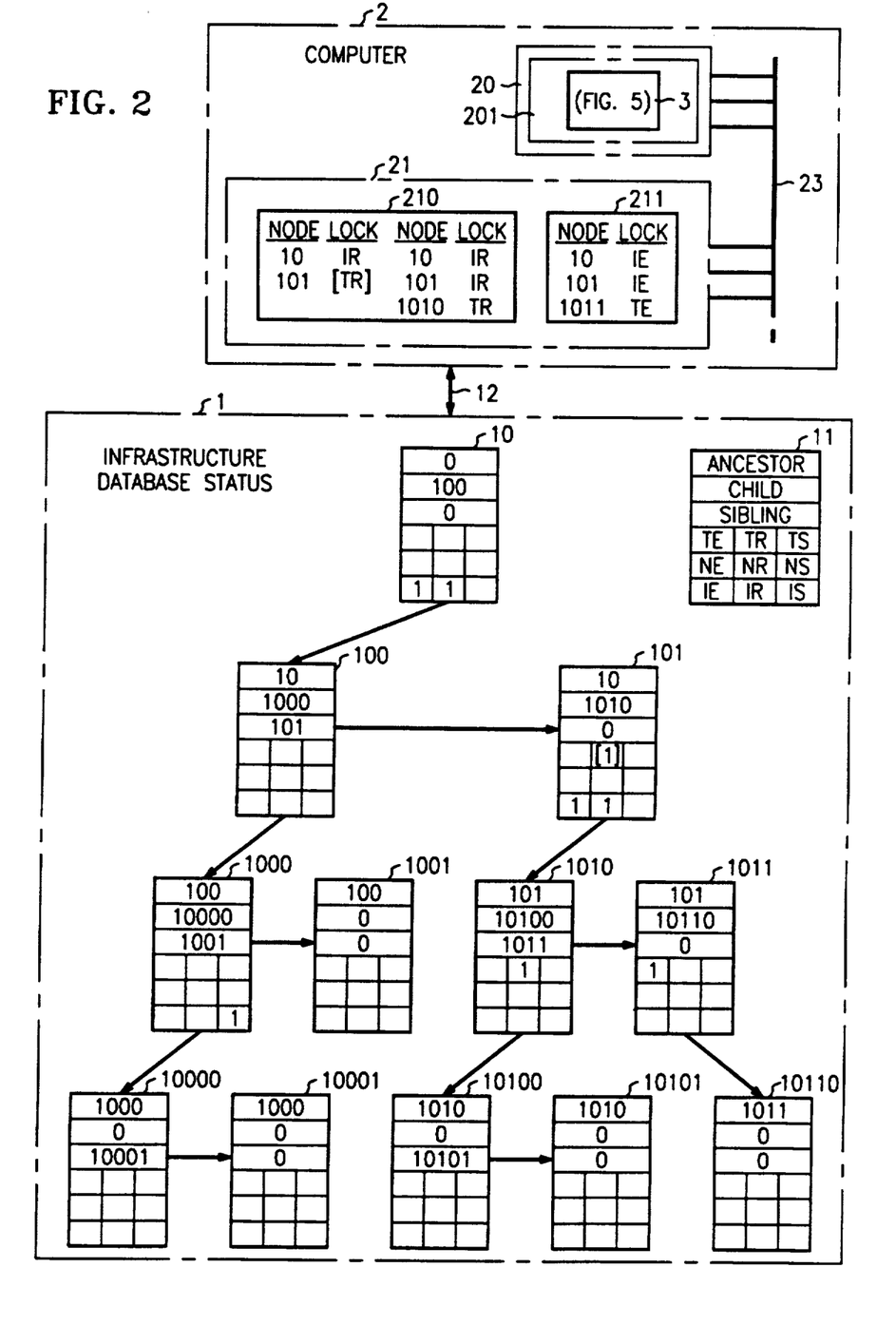
FIG. 2 sets forth illustrative processes and computer operation systems used with the information control system of FIG. 1.

Referring to FIG. 2, each complex node of infrastructure 1 is configured in accordance with key 11 wherein each node is identified by identifier information identifying the ancestor node of the node. In addition, each node has pointer information therein identifying a dependent child of the node and information identifying a sibling node having the same ancestor as the node. For example, block node 1010 has an identifier of 101 identifying file node 101 as a direct ancestor of block node 1010. The child pointer information identifies information node 10100 as a child of block node 1010 and the sibling information identifies block node 1011 having the same ancestor file node 101 as does block node 1010.

Each node of infrastructure 1 also includes information indicating a current lock status of the node. Such information is assumed for the present embodiment of the invention recorded by a register corresponding with the node, although not limited thereto. A register, shown in key 11, records the current lock status of a node of infrastructure 1. For example, a node lock register may indicate which tree exclusive TE, share TS and reserve TR locks have been imposed on the node. Each node register may also indicate that node exclusive NE, share NS and reserve NR locks, in addition to intermediate exclusive IE, share IS and reserve IR locks, have been imposed on the node. As an example, root node 10 register, FIG. 2, indicates that an intermediate exclusive IE and intermediate reserve IR locks are currently pending against root node 10.

In the operation of the present embodiment of the invention, processes 210 and 211 resident in memory unit 21 of a network computer, such as computer 2, are run in processor unit 20 with program 3 to control access to node information within infrastructure 1. If process 210 requires the reading of information from information node 10101, computer 2 obtains access of infrastructure 1, FIG. 1, via bus 23, interface unit 22 and data link 12 and may select information node 10101 directly or by root node 10. Root node 10 information initiates the selection of information node 10101 by child pointer data which identifies child file node 100. File node 100 directs process 210 to sibling file node 101 which in turn points to child block node 1010. Block node 1010 directs process 210 to child information node 10100 which in turn directs process 210 to sibling information node 10101. In order to write into or read information from information node 10101, process 210, via operation of program 3, must determine the current lock status of information node 10101, FIG. 1, ancestor block node 1010, file node 101 and root node 10.

Computer 2, having access to infrastructure 1 may run multiple process operations that require concurrent access to nodes of infrastructure 1. A process may enable the apparatus to selectively lock ones of the nodes and tree structures so as to lock a node and tree structure such that the process may write information into and read information from the locked node. The apparatus of the invention has registers associated with each infrastructure node for recording locks applied by concurrently running process against each node. When a process requests the application or the removal of a lock, computer 2, operating under control of program 3, responds to a lock application and removal request of processes by incrementing and decrementing a lock register associated with the process selected node and lock registers associated with ancestral nodes located in a tree structure of the process selected node to maintain a current record status of selective locks applied to each infrastructure node. Program 3 responds to a process request for a lock by selecting the appropriate node and lock identified by the process and generating a list of ancestral nodes related to the selected node. If, for example, process 210, FIG. 2, requests that a tree reserve TR lock be applied against file node 101, program 3, generates a list of ancestral nodes located in a tree structure related to selected file node 101, FIG. 1, comprising root node 10 and selected file node 101.

Figure 3:
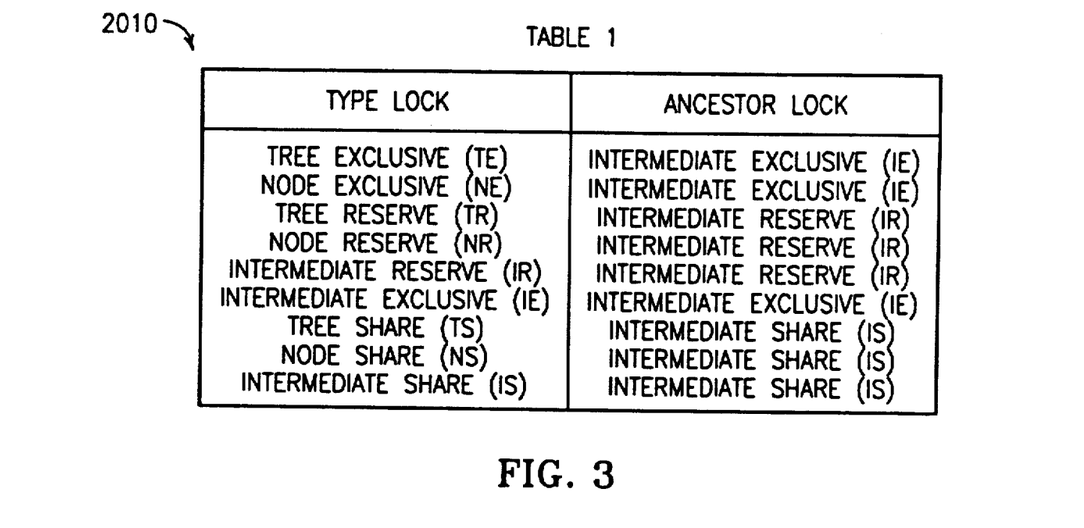
FIG. 3 sets forth an illustrative table showing a relationship of node and tree structure locks with corresponding intermediate locks applicable to ancestral nodes and tree structures related to a selected node and tree structure.

The apparatus, operating under control of program 3, FIG. 2, selects root node 10 from the generated list of ancestral nodes and determines that a lock is to be applied against root node 10. Program 3, in accordance with table 1, FIG. 3, determines that an intermediate reserve IR lock is required to be applied against an ancestral node, such as root node 10, when a requested tree reserve TR lock is to be applied against a child node such as file node 101. The compatibility of the intermediate type of lock corresponding with the requested lock as determined by table 1 is compared for compatibility, FIG. 4, table 2, with the current lock status of each listed ancestral node of the selected node such as ancestor root node 10. As set forth in compatibility table 2, FIG. 4, an intermediate reserve IR lock, indicated by the absence of a check mark, is compatible with tree, node and intermediate share TS, NS, IS locks, node and intermediate reserve NR, IR and with node and intermediate exclusive NE, IE locks. As indicated by check marks, an intermediate reserve IR lock is incompatible with tree exclusive and reserve TE, TR locks and may not be applied to a node when the node register indicates that these locks are currently pending against the node. It is assumed that the nodes of infrastructure 1 are initially free of locks. Thus, the intermediate reserve IR lock corresponding with the selected tree reserve TR lock may be applied against ancestral root node 10.

Program 3, FIG. 2, operative upon determination of the compatibility of the intermediate reserve IR lock with the current lock status of each listed ancestral node sets a register corresponding with the ancestral node to record that an intermediate reserve IR has been applied to and is currently pending against ancestral root node 10. After setting the lock registers of the ancestral nodes of the selected node to record that an intermediate reserve IR lock is currently pending against the ancestral nodes, the apparatus determines the compatibility of the selected tree reserve TR lock with the current lock status of selected file node 101. Since it was assumed that no locks were initially pending against the infrastructure nodes, program 3, in accordance with table 2, FIG. 4, determines that the requested tree reserve TR lock is compatible with the current lock stauts of selected file node 101 and sets the lock register, FIG. 2, corresponding with selected file node 101 to record that the requested tree reserve TR is being applied against selected file node 101. File node 101, FIG. 1, and dependent child nodes, such as block nodes 1010, 1011 and information nodes 10100, 10101, 10110 located in dependent tree structures of tree reserve TR locked file node 101 are then locked in accordance with the standards of the applied tree reserve TR lock. Concurrently running processes, such as process 211, are enabled access to file node 101 and dependent child node in accordance with the requirements of the tree reserve TR lock and the current status of file and dependent child nodes 101, 1010, 1011, 10100, 10101 and 10110.

The applied tree reserve TR lock reserve locks file node 101 and child nodes located in tree structures of reserve locked file node 101 to reserve the node and the node tree structures for subsequent access by process 210. During the running sequence, process 210 may finish with file node 101 but may have a need to later access ones of the child block and information nodes 1010, 1011, 10100, 10101, 10110 located in the tree structures of tree reserve TR locked file node 101. When process 210 has finished operations with file node 101, the tree reserve TR lock currently pending against file node 101 may be selectively applied to ones of the dependent child block and information nodes 1010, 1011, 10100, 10101, 10110 and then removed from file node 101 thereby freeing file node 101 which can now be accessed by concurrently running other ones of the processes such as process 211.

In the present embodiment of the invention, it is assumed that the infrastructure nodes are initially free of locks. It is further assumed that process 210, currently running on computer 2, has a request to place a tree reserve TR lock on file node 101. Program 3, running under control of process 210, FIG. 5, selects file node 101, step 301, and selects the requested tree reserve TR lock to be applied to selected file node 101, step 302. Program 3 generates a list of appropriate ancestor nodes, step 303, for file node 101 selected in step 301 and determines that process 210 is to apply the selected tree reserve TR lock, step 304. The ancestor list for file node 101, FIG. 1, includes root node 10 and file node 101.

Figure 4:
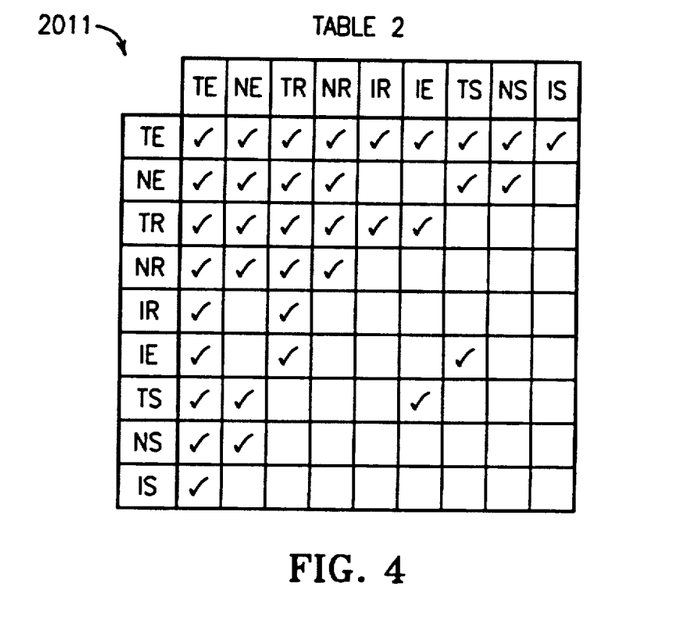
FIG. 4 illustrates a table setting forth a compatibility of selected locks with current lock status of selected nodes and tree structures and with node and tree structures that are ancestors of the selected node and tree structures.

Program 3, step 310, selects the first ancestor node, root node 10, from the ancestor node list and determines if the ancestor list node is the select node, step 311. Since root node 10 is not the select file node 101, program 3 determines from table 1, FIG. 3, that an intermediate reserve IR lock is required for each ancestor node when a tree reserve TR lock is to be applied to a selected child node. Program 3 proceeds to determine the compatibility of the intermediate reserve IR lock, step 312, by comparing the intermediate reserve IR lock with locks previously applied to root node 10. Since it is assumed that the infrastructure nodes are initially free of locks, it is determined that intermediate reserve IR lock, table 2, FIG. 4, is compatible with the current lock status of ancestor root node 10. Since there is no conflict with locks by other processes, step 313, program 3 applies the intermediate reserve IR lock by setting the register associated with root node 10 to record that an intermediate reserve IR lock has been applied to and is currently pending against ancestral root node 10, FIG.

Figure 5:
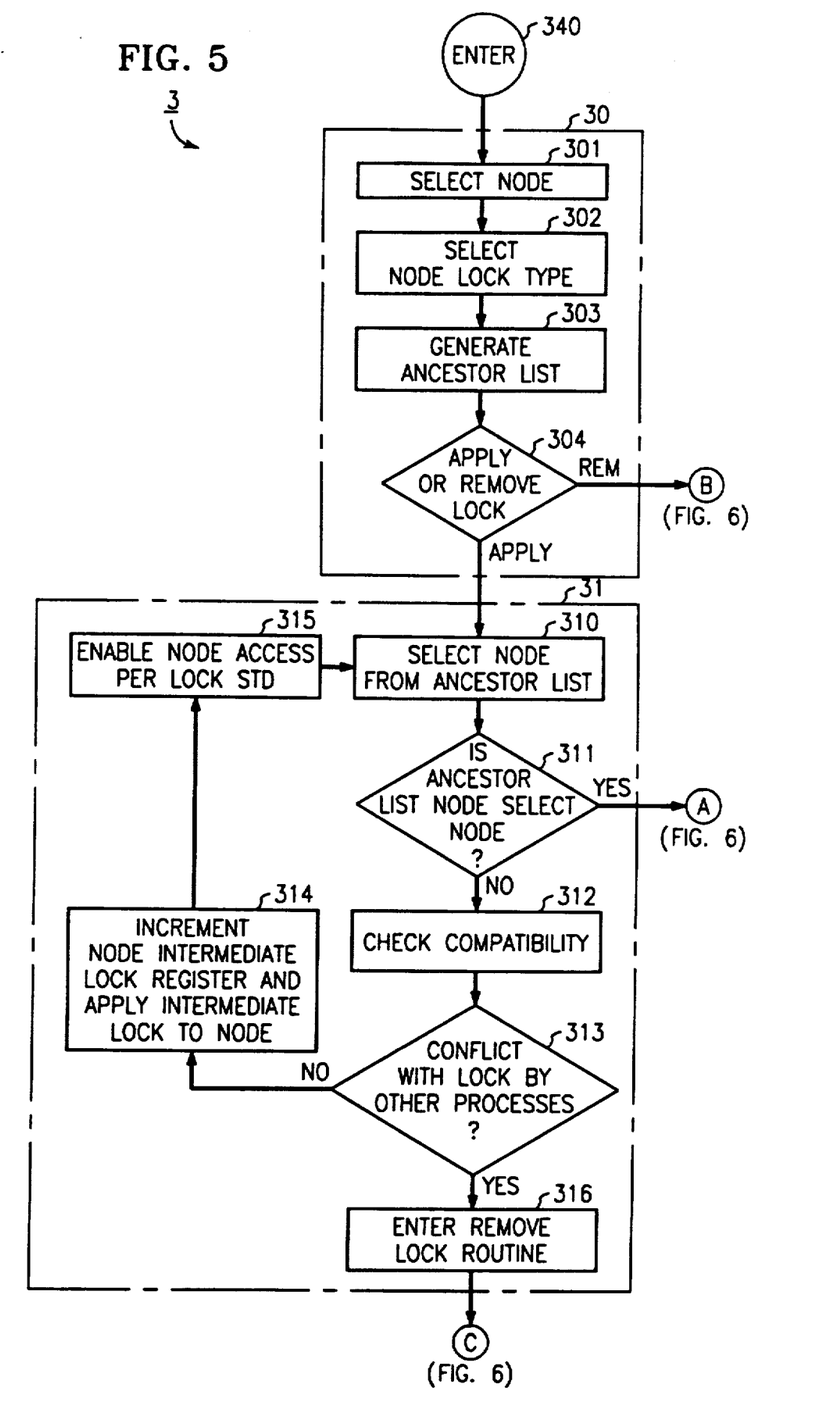
FIGS. 5 and 6 illustrate a flow chart of the operation of the control information system set forth in FIG. 1 in accordance with the principles of the invention.

5, step 314. Process access, step 315, is given to root node 10 in accordance with standards of locks currently pending against root node 10.

Program 3 selects the next node from the ancestor list, step 310, which is file node 101. Since file node 101 is the select node, step 311, the requested or selected tree reserve TR lock, FIG. 6, step 320, to be applied to select file node 101 is compared for compatibility, as set forth in table 2, FIG. 4, with the current lock status of file node 101. Since it is assumed that file node 101 does not initially have pending locks, it is determined that the selected tree reserve TR lock, table 2, FIG. 4, is compatible with the current lock status of file node 101, step 321. Accordingly, the selected tree reserve TR lock is applied to file node 101 and the register associated with file node 101 is incremented to record that a tree reserve TR lock has been applied to file node 101, step 322, and process access is granted to select file node 101 in accordance with the standards of locks currently pending against file node 101.

Program 3, step 323, establishes a process node and tree record of the locks currently applied to infrastructure 1, FIG. 2, by and in process 210 indicating that a tree reserve TR lock has been applied to file node 101 and an intermediate reserve IR lock applied to ancestor root node 10. Process 210 access to file node 101 is granted in accordance with the standards of the tree reserve TR lock currently pending against file node 101 and program 3 exits from the lock sequence, FIG. 6, step 341.

If, during the sequence of comparing the compatibility of a select lock to be applied to a select node with the current lock status of the select node, it is determined that the select lock is not compatible with the current lock status of the node, step 321, it is necessary to remove all intermediate locks that have previously been applied to ancestral nodes of the select node during the current operation of program 3. Thus, if the select node tree reserve TR lock had been incompatible with the current lock status of select file node 101, step 321, program 3 would ask if the current node is the root node, step 324. Since file node 101 is not root node 10, program 3 proceeds to remove lock sequence 33 and choose the previous node, root node 10, from the ancestor list, step 333. The intermediate reserve IR lock register associated with root node 10 is decremented by 1 to indicate that the intermediate reserve IR lock previously applied to root node 10 is now removed, step 331. Program 3 then determines if the node is the root node, step 332. Since node 10 is the root node, step 332, and it is assumed that the present select lock is not compatible with the current lock status of select file 101, step 334, program 3 indicates a lock failure, step 335, and exits the lock sequence.

After the tree reserve TR lock has been applied to file node 101, process 210, having earlier requested the application of the tree reserve TR lock to file node 101, may transport the tree reserve TR lock from file node 101, FIG. 1, to child nodes, such as block node 1010, located in dependent tree structures of file node 101. The tree reserve TR lock set forth in FIG. 1 as tree reserve [TR] lock may, in accordance with the principles of the invention, be transported from file node 101 and applied to child nodes of file node 101 such as block node 1010.

Process 210 initiates a request to program 3 to transport the tree reserve TR lock currently pending against file node 101, FIG. 1, to child block node 1010 located in a dependent tree structure of file node 101 which in turn is a child node of ancestor root node 10. Program 3 responds to the request of process 210, FIG. 5, by identifying the type of lock, tree reserve [TR] lock, that is to be transported to child block node 1010 and removed from select file node 101. Child block node 1010 is identified as the select node, step 301, and the tree reserve TR lock is identified as the select lock, step 302. Program 3, step 303, generates an ancestor list identifying ancestor root node 10, file node 101 and child block node 1010 and selects root node 10, step 310, from the generated ancestor list. Since ancestor root node 10 is not the select child node 1010, step 311, program 3 checks the compatibility of an intermediate reserve IR lock corresponding with the tree reserve TR lock to be transported from file node 101 with the current lock status of root node 10. In determining compatibility during the sequence of a process requesting the transpor of a tree lock previously applied by the process to the ancestor node from the ancestor node, such as file node 101, to child nodes, such as block node 1010, program 3 compares the lock to be applied only with respect to locks applied by other processes. Thus, the present intermediate reserve IR lock does not conflict with the intermediate reserve IR lock previously applied by process 210, and since it is assumed that no other process locks are currently pending against root node 10, step 313, program 3 increments the intermediate reserve IR lock register corresponding with root node 10 to indicate that another intermediate reserve IR lock is currently pending against root node 10 and access to root node 10 is granted in accordance with the current lock status of root node 10, steps 314, 315.

The next node, file node 101, is selected from the ancestor list, step 310, and it is determined that file node 101 is not select child block node 1010, step 311. The tree reserve [TR] lock previously applied by the present process 210 is currently pending against file node 10. However, program 3, in determining compatibility, step 312, checks compatibility of the present intermediate reserve IR lock to be applied to file node 101 with locks that have been applied by other processes to file node 101. Thus, since the only lock currently pending against file node 101 is the tree reserve [TR] lock previously applied by the present process 210, there is no conflict with locks applied by other processes, step 313, and program 3 applies the intermediate reserve IR lock to ancestor file node 101 and increments the intermediate reserve IR lock register corresponding with file node 101, step 314. Process access to file node 101 is enabled in accordance with the current lock status of file node 101, step 315. The next node, block node 1010, is then selected from the ancestor list, step 310.

Figure 6:
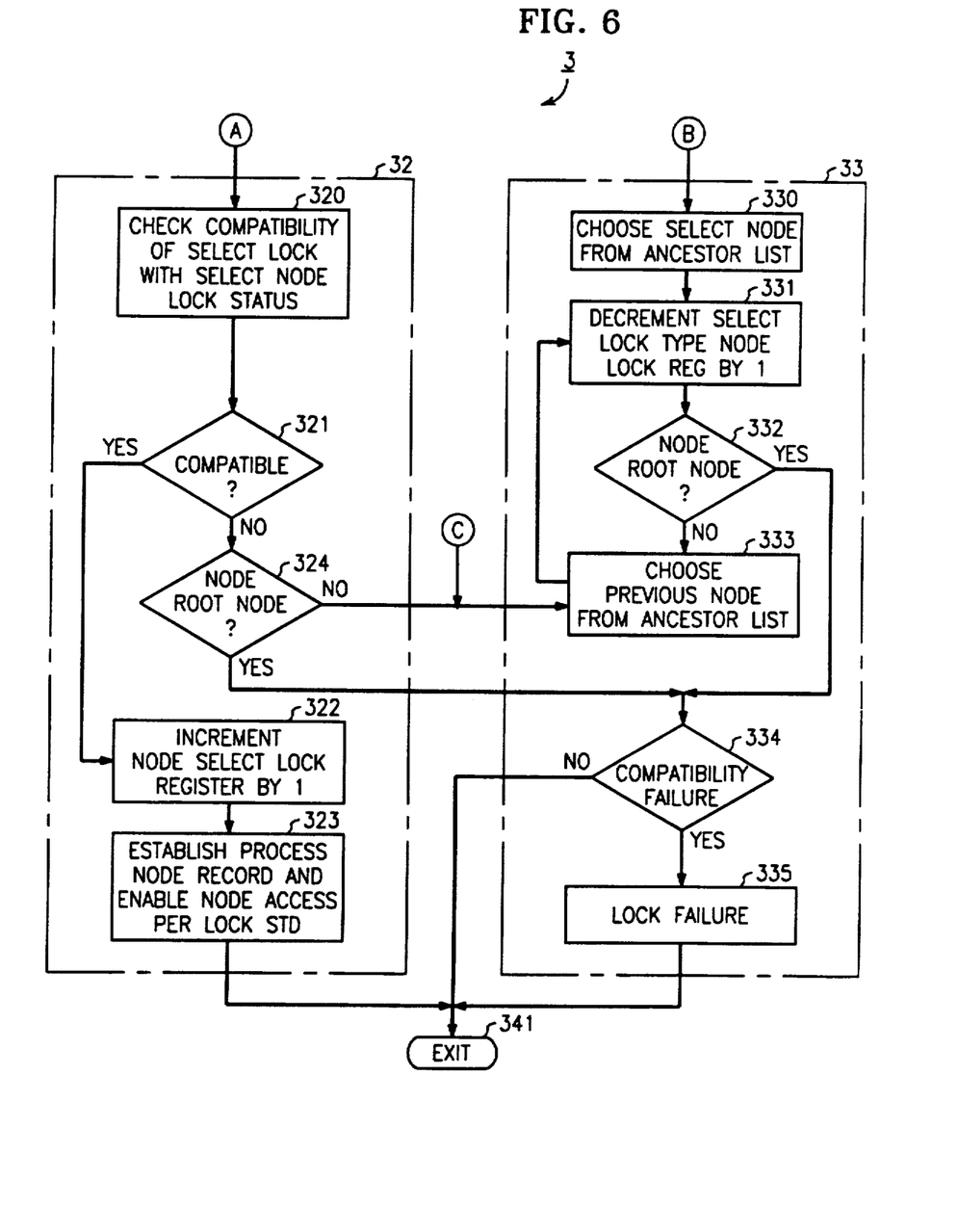

Block node 1010 is the select child node, step 311, and program 3, FIG. 6, step 320, checks the compatibility of the tree reserve [TR] lock to be transported to child block node 1010, step 321, with the current lock status of node 1010. Since there are no locks pending against child block node 1010, it is determined that the tree reserve [TR] lock, step 321, is compatible with node 1010 and can be transported thereto. Accordingly, the tree reserve [TR] lock is applied against child block node 1010 and the tree reserve TR lock register corresponding therewith is incremented by 1 to show that tree reserve [TR] lock has been transported to and is currently pending against child block node 1010, step 322. A process node record, FIG. 2, is established in running process 210 showing that intermediate reserve IR locks are currently pending against ancestor root and file nodes 10, 101 and that the transported tree reserve TR lock is currently pending against child block node 1010, FIG. 6, step 323.

Program 3, in removing tree reserve [TR] lock from file node 101, selects file node 101, FIG. 5, step 301, and determines that a tree reserve [TR] lock is to be removed from file node 101, step 302. The generated ancestor list, step 303, lists ancestor root and file nodes 10, 101. Since a lock is to be removed, step 304, program 3 chooses the node 101 from the ancestor list, FIG. 6, step 330, and decrements the tree reserve TR lock associated therewith to indicate that the tree reserve [TR] lock has been removed from file node 101, step 331. Since file node 101 is not root node 10, step 332, program 3 chooses the next node, root node 10, from the ancestor list, step 333, and decrements the intermediate reserve IR register corresponding with root node 10 to indicate that the intermediate reserve IR lock corresponding with the transported tree reserve [TR] lock removed from file node 101 is now removed from ancestor root node 10. When the current node is a root node, such as root node 10, program 3 asks if there has been a compatibility failure, step 334, which there will not be a compatibility failure upon removal of a lock, and exits from the lock sequence, step 341. A process node record, FIG. 2, is established in running process 210 showing that intermediate reserve IR locks are currently pending against ancestor root and file nodes 10, 101 and that the transported tree reserve [TR] lock is currently pending against child block node 1010. Multiple processes currently running on computer 2 with process 210 are now enabled to access file node 101 in accordance with the standards of the new lock register status of file node 101 and as set forth in compatibility table 2, FIG. 4.

When tree reserve TR lock was originally pending against file node, processes could only, as set forth by compatibility table 2, FIG. 4, apply tree, node and intermediate share TS, NS, IS locks against file node 101. Tree, node and intermediate exclusive and reserve TE, NE, IE, TR, NR, IR locks are incompatible with the tree reserve TR lock. In addition to the lock limitations on file node 101, processes could only apply tree, node and intermediate share TS, NS, IS locks on child nodes of tree reserve TR locked file node 101 as these types of locks are the only ones compatible with a tree reserve TR lock.

Once the tree reserve TR lock has been transported to child block node 1010 and removed from file node 101 and replaced by an intermediate reserve IR lock, table 2 indicates that node and intermediate exclusive and reserve NE, IE, NR, IR along with tree, node and share TS, NS, IS locks may be applied against file node 101 by other processes, such as process 211, concurrently running with process 210. Thus, process 211 may now apply a tree exclusive TE lock to child block node 1011 which is dependent upon ancestor file node 101, assuming that the tree exclusive TE lock is compatible with the current lock status of block node 1011 in that an intermediate exclusive IE lock is compatible, FIG. 4, table 2, with all types of locks except tree exclusive, reserve and share TE, TR, TS locks. Thus, after the tree reserve TR lock has been transported by process 210 from file node 101, FIG. 2, to child block node 1010, currently running process 211, may apply a tree exclusive TE lock to child node 1011 assuming that the tree exclusive TE lock is compatible with the current lock status of block node 1011 and that the associated intermediate exclusive IE lock is compatible with the current lock status of ancestor root and file nodes 10, 101. Following application of the node exclusive NE lock to block node 1011, program 3 sets the appropriate register and establishes a process node record in concurrently running process 211 showing that intermediate and tree exclusive IE, TE locks have been applied to and are currently pending against ancestral root and file nodes 10, 101, and child block node 1011, respectively.

I claim:

1. Apparatus for controlling concurrent process operations against a complex infrastructure comprising tree structures of complex object nodes wherein said apparatus comprises means responsive to a process operation for selectively applying a tree lock to a node and intermediate tree locks to each ancestral node of said node to lock said node and ancestral nodes and ones of child nodes located in a tree structure of said locked node, and means responsive to said process operation for subsequently applying said tree lock to ones of said child nodes located in said tree structure and removing said applied tree lock from said node thereby freeing said node and unlocked child nodes located in said tree structure of said node for access by concurrently running one of the process operations.

2. The infrastructure controlling apparatus set forth in claim 1 comprising means responsive to said process operation requesting said tree lock for selecting said node and generating a list of ancestral nodes located in said tree structure of said selected node.

3. The infrastructure controlling apparatus set forth in claim 2 comprising means enabled upon selecting said node and generating said list of ancestral nodes for comparing a compatibility of an intermediate type lock corresponding with said requested tree lock with a current lock status of each listed ancestral node.

4. The infrastructure controlling apparatus set forth in claim 3 comprising means operative upon determination of said compatibility of said intermediate type lock with each ancestral node current lock status for applying said intermediate type lock to each listed ancestral node.

5. The infrastructure controlling apparatus set forth in claim 4 comprising means enabled upon applying said intermediate type lock to all listed ancestral nodes for comparing a compatibility of said requested tree lock with a current lock status of said selected node and upon determining said compatibility for applying said requested tree lock to said selected node.

6. The infrastructure controlling apparatus set forth in claim 5 comprising means responsive to said process operation for subsequently applying said tree lock to ones of child nodes located in said tree structure and for removing said applied tree lock from said node thereby freeing said node and unlocked child nodes located in said tree structures of said node for access by concurrently running ones of the process operations.

7. Apparatus for controlling concurrent process operations against a complex infrastructure comprising tree structures of complex object nodes wherein said apparatus comprises     means responsive to one of said process operations requesting a tree lock for one of said nodes for selecting said one node and generating a list of ancestral nodes located in a tree structure of said selected node,     means enabled upon selecting said node and generating said list of ancestral nodes for comparing a compatibility of an intermediate type lock corresponding with said requested tree lock with a current lock status of each listed ancestral node,     means operative upon determination of said compatibility of said intermediate type lock with said current lock status of each listed ancestral node for applying said intermediate type lock to each said listed ancestral node,     means enabled upon applying said intermediate type lock to all listed ancestral nodes for determining a compatibility of said requested tree lock with a current lock status of said selected node and upon determining said compatibility for applying said requested tree lock to said selected node, and     means responsive to said process operation for subsequently applying said tree lock to ones of said child nodes located in said tree structure and for removing said applied tree lock from said node thereby freeing said node and child nodes located in other tree structures of said node for access by concurrently running ones of the process operations.

8. A computer implemented method for controlling concurrent process operations against a complex infrastructure comprising tree structures of complex object nodes of information comprising the steps of     selectively applying in response to a request of one of the process a tree lock to a node and intermediate tree locks to each ancestral node of said node to lock said node and ancestral nodes and ones of child nodes located in a tree structure of said locked node, and     transporting in response to a subsequent request of said process said applied tree lock from said node to ones of said child nodes located in said tree structure thereby freeing said node and other child nodes located in said tree structure of said node for access by concurrently running ones of the processes.

9. The computer implemented method of controlling concurrent process operations in an infrastructure as set forth in claim 8 wherein said selectively applying step comprises the step of     selecting said node in response to said process request and generating a list of ancestral nodes located in said tree structure of said selected node.

10. The computer implemented method of controlling concurrent process operations in an infrastructure as set forth in claim 9 wherein said selectively applying step comprises the step of     comparing a compatibility of an intermediate type lock corresponding with said requested tree reserve lock with a current lock status of each listed ancestral node.

11. The computer implemented method of controlling concurrent process operations in an infrastructure as set forth in claim 10 wherein said selectively applying step comprises the step of     applying upon determination of said compatibility of said intermediate type lock with each ancestral node current lock status said intermediate type lock to each listed ancestral node.

12. The computer implemented method of controlling concurrent process operations in an infrastructure as set forth in claim 11 wherein said selectively applying step comprises the step of     comparing upon applying said intermediate type lock to all listed ancestral nodes a compatibility of said requested tree lock with a current lock status of said selected node and upon determining said compatibility applying said requested tree lock to said selected node.

13. The computer implemented method of controlling concurrent process operations in an infrastructure as set forth in claim 12 wherein said transporting step comprises the step of     transporting said tree reserve lock by applying said tree lock to process selected ones of said child nodes located in said tree structure and removing said tree lock from said node in response to said process thereby freeing said node for access by concurrently running processes.

14. A computer implemented method for controlling concurrent process operations against a complex infrastructure comprising tree structures of complex object nodes of information comprising the steps of     selecting in response to a request of one of the processes a tree lock for one of said nodes and generating a list of ancestral nodes located in a tree structure of said node,     comparing a compatibility of an intermediate type lock corresponding with said requested tree lock with a current lock status of each listed ancestral node,     applying said intermediate type lock to each listed ancestral node upon determination of said compatibility of said intermediate type lock with said current lock status of each listed ancestral node,     determining a compatibility of said requested tree lock with a current lock status of said node upon applying said intermediate type lock to all listed ancestral nodes and after determining said compatibility applying said requested tree lock to said node to tree lock said node, and     subsequently applying said tree lock to selected ones of child nodes located in said tree structure of said node and removing said applied tree lock from said node in response to a subsequent request of the process to transport said tree lock to said selected child nodes thereby freeing said node for access by concurrently running processes.

* * * * *